Dec. 20, 1960     B. LIPPEL     2,965,879
SOUND LOCATING MEANS

Filed Feb. 5, 1946     6 Sheets-Sheet 1

FIG. I.

*INVENTOR.*
BERNARD LIPPEL

BY

William D. Hall.
ATTORNEY

INVENTOR.
BERNARD LIPPEL

Dec. 20, 1960      B. LIPPEL      2,965,879
SOUND LOCATING MEANS
Filed Feb. 5, 1946      6 Sheets-Sheet 3

*INVENTOR.*
BERNARD LIPPEL
BY
*William D. Hall.*
ATTORNEY

Dec. 20, 1960

B. LIPPEL 2,965,879

SOUND LOCATING MEANS

Filed Feb. 5, 1946

INVENTOR.
BERNARD LIPPEL

BY

William D. Hall

ATTORNEY

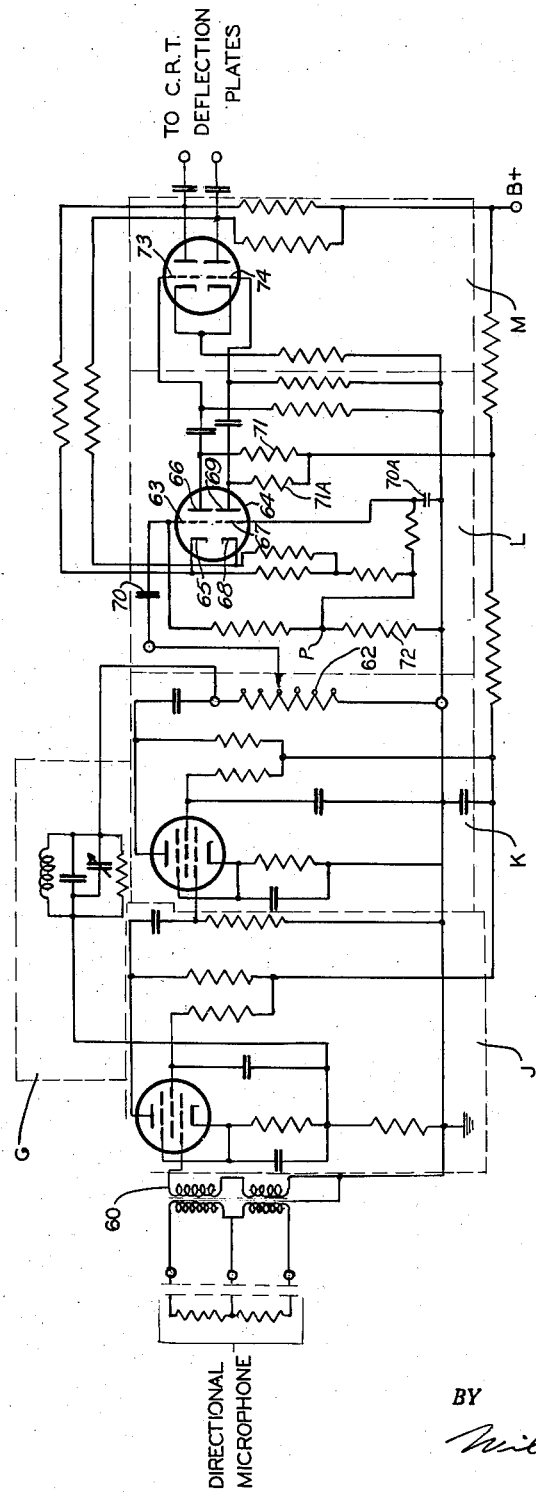

Dec. 20, 1960    B. LIPPEL    2,965,879
SOUND LOCATING MEANS
Filed Feb. 5, 1946    6 Sheets-Sheet 6

INVENTOR.
BERNARD LIPPEL
BY
William D. Hall
ATTORNEY

United States Patent Office 2,965,879
Patented Dec. 20, 1960

2,965,879

SOUND LOCATING MEANS

Bernard Lippel, Long Branch, N.J., assignor to the United States of America as represented by the Secretary of War Filed Feb. 5, 1946, Ser. No. 645,681

8 Claims. (Cl. 340—16)

(Granted under Title 35, U.S. Code (1952), sec. 266)

The invention described herein may be manufactured and used by or for the Government for governmental purposes, without the payment to me of any royalty thereon.

One of the objects of this invention is to determine the direction of a sound from measurement of the orientation of the sound wave front, without the use of an extended array of microphones, or the measurement of time differences.

Another object is to provide for instantaneous direct reading of sound direction without calculations or the use of computing devices and to provide an apparatus which requires a minimum of training of the operator.

Still another object is to display the azimuths of sound sources on a fluorescent screen, preferably of the "long persistence" type, so that several different sound sources, emitting sounds which are heard almost simultaneously, may be observed at once.

Still another object is to suppress undesired signals.

Still another object is to provide an arrangement whereby the distance of a sound source may be determined.

Still another object is to eliminate 180° ambiguity in directional indication by displaying a radial, rather than a diametral trace.

Still another object is to indicate the direction of arrival of sounds by oscillographic means so arranged that travel of a transient sound by multiple paths, whereby a plurality of transients arrive at the receiving apparatus with azimuthal separation but without sufficient time separation to produce one or more distinct echoes, will be recognizable from the character of the observable trace.

Still another object is to provide an arrangement whereby continuous as well as transient sounds may be located.

A more complete understanding of the invention may be had by reference to the following description of an illustrative embodiment thereof when considered in connection with the accompanying drawings wherein:

Fig. 8 is a schematic drawing illustrating the operation of a deflection channel amplifier associated with a directional microphone;

Figure 1:
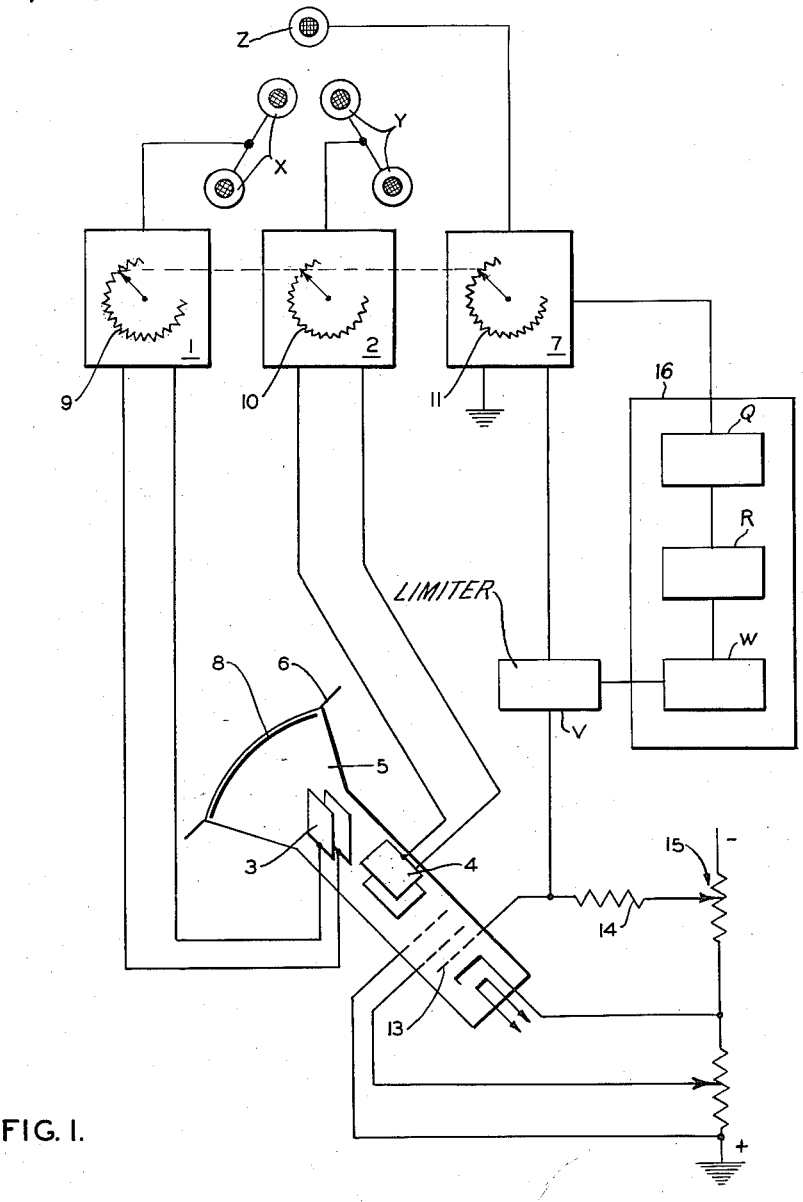
Fig. 1 is a block diagram of a sound wave direction finding apparatus embodying the principles of my invention.

Referring to Fig. 1, there is shown an acoustical transducer assembly consisting of a pair of bidirectional microphones X and Y and a non-directional microphone Z. Directional microphones X and Y preferably have a precise "cosine" directional characteristic for sounds in a predetermined frequency range. The principles governing the design of such microphones are well known. The directional microphones X and Y are preferably assembled into a single unit with their axes of maximum sensitivity perpendicular and with their acoustical centers either coincident or close together with the line joining the centers perpendicular to each of the axes.

The outputs of directional microphones X and Y are channeled by means of linear amplifiers 1 and 2 respectively to the horizontal and vertical deflecting means (plates or coils) 3 and 4 of a cathode ray tube 5, while the output of non-directional microphone Z is channeled to control grid 13 of cathode ray tube 5 by linear amplifier 7. A control circuit consisting of discriminator Q, control diode R and impedance stage W is associated with amplifier 7 to control the output amplitude level thereof. Amplifiers 1 and 2 are hereinafter designated as deflection channel amplifiers. It is preferred that microphones X and Y and amplifiers 1 and 2 have identical phase shift characteristics.

In one form of this invention deflection channel amplifiers 1 and 2 are band pass amplifiers having a restricted frequency response and whose relative gain is adjusted so that equal sound components at the directional microphones result in equal horizontal and vertical components of deflection of the cathode ray beam.

A set of closely matched ganged attenuators, 9 and 10, may be inserted at suitable places in the amplifiers to enable the overall gain of amplifiers 1 and 2 to be varied identically and simultaneously. A suitably calibrated angular scale 6, or an optical image thereof, surrounds the fluorescent screen and is accurately centered about the quiescent position of the luminous cathode ray spot or about the intersection of the cathode ray tube traces which are generated by applying the outputs of microphones X and Y to the vertical and horizontal deflection plates respectively.

Any sounds arriving at the directional amplifiers are respectively channeled to deflection plates 3 and 4 thus causing the cathode ray beam to be deflected radially leaving a diametral trace on the fluorescent screen 8 of cathode ray tube 5. The trace orientation can be read by means of the surrounding scale 6. An advantage of this form of the apparatus, with the directional microphones perpendicular and the deflection channel amplifiers equally sensitive lies in the fact that the angle assumed by the diametral trace, measured with respect to a suitable index on the scale, is equal to the azimuth angle of the sound measured from a suitable reference direction fixed with respect to the transducer, resulting in a linear calibration of the reference scale 6 and uniform sensitivity of the sound direction finder for sounds at all azimuths.

In other forms of this invention one channel amplifier is made more sensitive than the other and/or the angle between the directional microphones is other than a right angle and/or the CR beam is eccentrically positioned with respect to the reference scale 6, the scale being non-uniformly calibrated to indicate sound azimuth, resulting in increased sensitivity at one or more azimuths.

Commercial quality cathode ray tubes designed for electrostatic deflection of the beam may not have the individual horizontal and vertical traces exactly perpendicular. Accurate readings can be obtained against a uniformly graduated scale with such a tube if such deviation of the traces is compensated by adjusting slightly the angle between the axes of the directional microphones. For example, while viewing the screen in the normal viewing manner and with the transducer in operation, the Y microphone axis should be placed perpendicular to the cathode ray tube trace resulting from the output of microphone X, the X microphone axis adjusted to be perpendicular to the cathode ray tube trace resulting from the output of microphone Y, the reference scale centered about the intersection of the X and Y cathode ray tube trace and the scale adjusted so that a trace resulting from the output of microphone X falls on the scale markings at 90° and 270°. The angle of a cathode ray trace as read against the reference scale will now be equal to angle which the normal to the sound wave front makes with the Y microphone axis. I prefer to equip the transducer with a scale and index which can be used to set the directional microphones at the proper angle for compensation when the angle between the cathode ray tube traces is known.

It will be clear to persons skilled in the art that the use of a cathode ray tube is not essential, but that any suitable oscillographic device capable of handling simultaneously two or more component signals to produce deflections at various angles, as in the cathode ray tube, may be employed. Where the expression "cathode ray tube" appears in this specification, it will be understood that such a general type of oscillograph is implied. It should be understood that any suitable amplifier having the required characteristics may be used in place of the amplifiers shown or described in this specification.

Inasmuch as the indication is a diametral trace with the apparatus described above, there is ambiguity of 180° in the angular indication since sound waves approaching the directional microphones from either of two directions 180° apart will cause the two microphones to generate output signals of equal relative intensity and the same relative phase. In certain cases such ambiguity may be objectionable. In such cases I provide "sense" by means of a third microphone, Z, located in the transducer, which microphone is non-directional with respect to sounds in the azimuthal plane, and which, in combination with its associated channel amplifier 7, develops an electrical signal across impedance 14 which appears on the cathode ray tube intensity grid 13 and varies the brightness of the beam to produce a radial trace (like a clock hand). To form a good radial trace the combination of microphone Z and channel amplifier 7 should have frequency and phase characteristics similar to those of microphone X and amplifier 1, and microphone Y and amplifier 2, so that the signals at the outputs of the three amplifiers have substantially identical waveshape and phase, except that the signal from amplifier 7 may be subjected to limiting action or peak clipping before being impressed on grid 13. The intensity of the cathode ray beam in the cathode ray tube 5 is set slightly below the threshold of visibility by applying a bias voltage to the intensity grid 13 of the cathode ray tube from potentiometer 15, which is connected across the voltage supply source. If a sound source is rotated about the transducer, the output of non-directional microphone Z (and therefore the signal on grid 13) remains constant in quality, but the outputs of the directional microphones X and Y (and consequently of amplifiers 1 and 2) suffer phase reversals of such nature that the luminous radius rotates in synchronism with the sound source, thereby providing an angular indication without ambiguity as to sense.

The problem of locating the origin of sound waves from gun fire is complicated by the fact that two sound waves are involved. One of these is generally referred to as a muzzle blast wave and the other is generally referred to as a ballistic wave. Since indications due to the ballistic wave may interfere with a desired indication of the muzzle blast wave, it may be desirable to suppress the ballistic wave. Such suppression can be conveniently accomplished by arranging that amplifier 7 shall fail to produce for such signals an electrical output of sufficient intensity to brighten the trace to the point of easily observed luminosity. In one form of this invention it is desirable that the ballistic or shock wave from high speed projectiles which contains significant energy fractions at both high and low frequencies, be suppressed so that only the muzzle blast, having the bulk of its energy in the band 0 to 400 cycles per second, may be observed. The amplifier circuit shown in Fig. 2 accomplishes such suppression.

Figure 2:
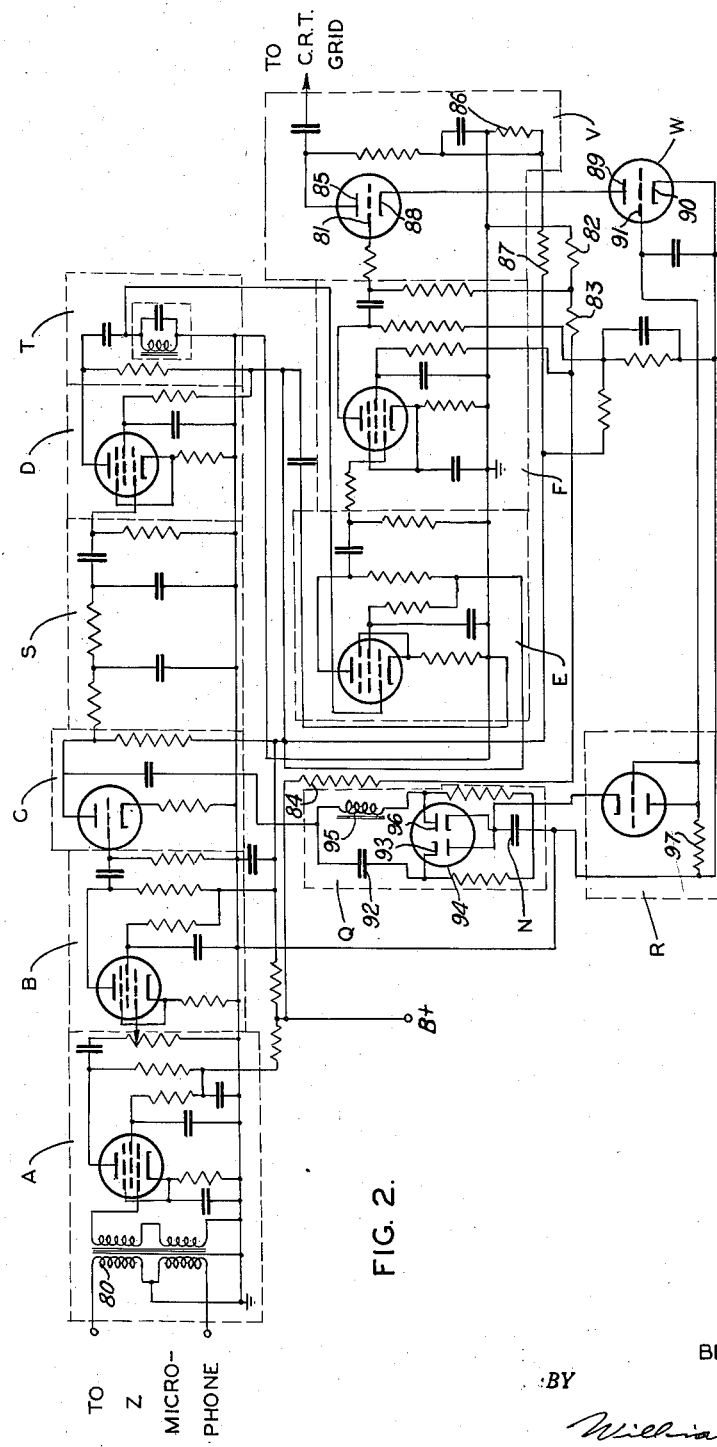
Fig. 2 is a schematic drawing illustrating the operation of a channel amplifier associated with a non-directional microphone.

Referring to Fig. 2, there is shown an amplifier circuit consisting of input transformer 80, cascaded amplifiers A, B and C, cascaded amplifiers D, E and F, a compensating network S coupled between amplifier C and amplifier D for correcting any inherent phase differences which may exist between microphone Z and directional microphones X and Y, a filter network Y coupled between amplifiers D and E to provide a band pass characteristic similar to that existing in deflection channel amplifiers 1 and 2, and a peak limiting tube V responsive to the output of amplifier F. The output of tube V is applied to grid 13 of cathode ray tube 5 as an intensifying voltage.

The output of amplifier C is also fed to a control circuit consisting of discriminator Q, the output of which is applied as a control voltage to impedance tube W through control diode R. Impedance tube W is placed in the cathode of limiter stage V to control the amplification thereof, thus controlling the amount of intensifying voltage applied to grid 13 of cathode ray tube 5.

In operation, the output signals of non-directional microphone Z are fed to input transformer 80 and said signals are amplified in cascaded amplifier stages A, B and C. The amplified signal from amplifier C is fed simultaneously to discriminator Q and, through compensating network S to amplifier D. The amplified signals from amplifier D are further amplified in cascaded amplifiers E and F, the output of amplifier F being applied to control grid 81 of limiter stage V. Grid 81 has a positive potential applied thereto through voltage dividing resistors 82, 83 and 84. The maximum positive output voltage from plate 85 of stage V is limited by the values of voltage divider resistors 86 and 87. Cathode 88 of stage V is connected to plate 89 of impedance tube W and cathode 90 of tube W is connected to ground.

Since cathode 88 of stage V is directly connected to the plate circuit of tube W, the gain of limiter stage V is controlled by the output from tube W, inasmuch as a negative voltage applied to control grid 91 of tube W will cause the internal resistance of tube W to rise and, at the same time, will cause cathode 88 of stage V to become more positive, thus biasing grid 81 more negatively. The negative voltage applied to grid 91 is controlled by the output from discriminator as described below.

The input circuit of discriminator Q consists of two parallel paths. One of these paths includes capacitor 92 which is connected to cathode 93 of duo-diode 94 and the other path includes inductance 95 which is connected to plate element 96 of duo-diode 94. The remaining plate and cathode elements of duo-diode 94 are joined together and connected to capacitor N, across which the voltage output of discriminator Q is developed. The inductance path is responsive to the lower frequencies which are found in both ballistic and muzzle blast waves; while the capacitance path is responsive to the higher frequencies which are found in strength only in the ballistic wave. Thus, by properly choosing capacitor 92 and inductance 95, a positive voltage will be developed across capacitance N when the muzzle blast arrives at microphone Z. The voltage developed across capacitance N is applied to the cathode of control diode R. Thus diode R will only conduct when a negative voltage is developed across N.

Resistor 97 is connected between the plate of diode R and ground, and the plate of diode R is directly connected to control grid 91 of tube W. Thus, when diode R conducts, a negative voltage will be developed across resistor 97 which is applied to grid 91 of impedance tube W thereby resulting in an increase in resistance of impedance tube W and consequently a more positive voltage being applied to cathode 88 of stage V. Thus the amplification of output stage V is reduced to such an extent that the signal upon the intensity grid of the cathode ray tube intensity grid 13 is insufficient to produce a clearly discernible trace. The ballistic wave is thus suppressed so that only the muzzle blast may be observed on the cathode ray tube screen.

If a positive voltage is generated across capacitor N, tube W will not be affected in any manner since diode R is non-conductive, consequently, the amplification of stage V will not be reduced when a muzzle blast is received by microphone C.

Figure 3:
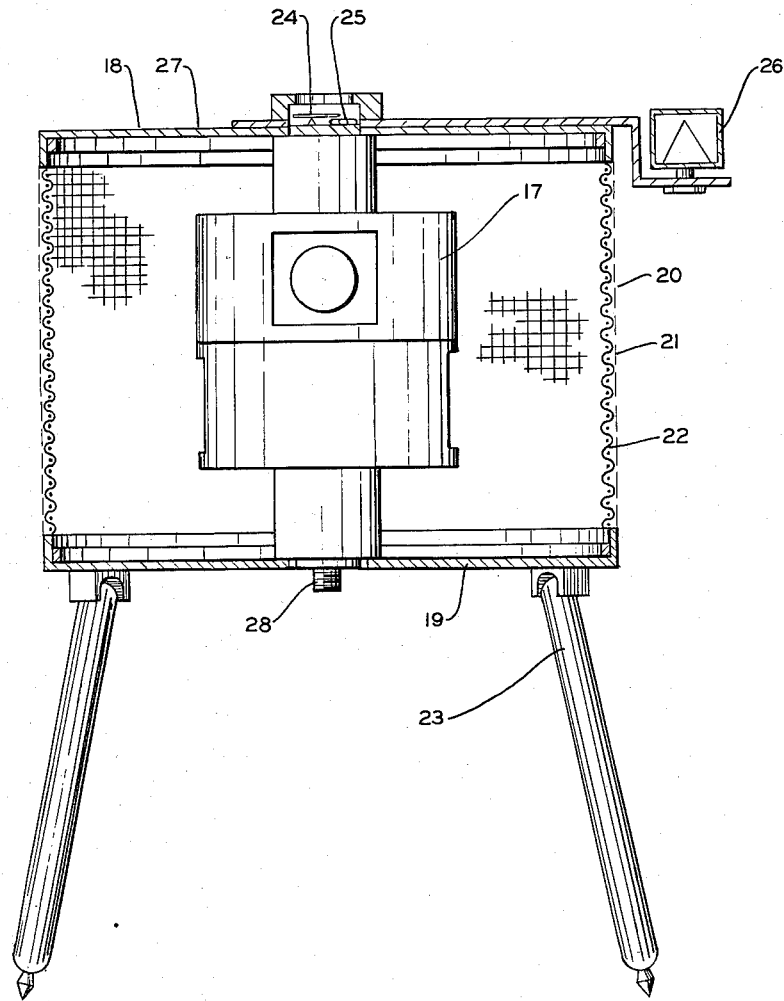
Fig. 3 shows a typical form of transducer used in the present invention.
Figure 10:
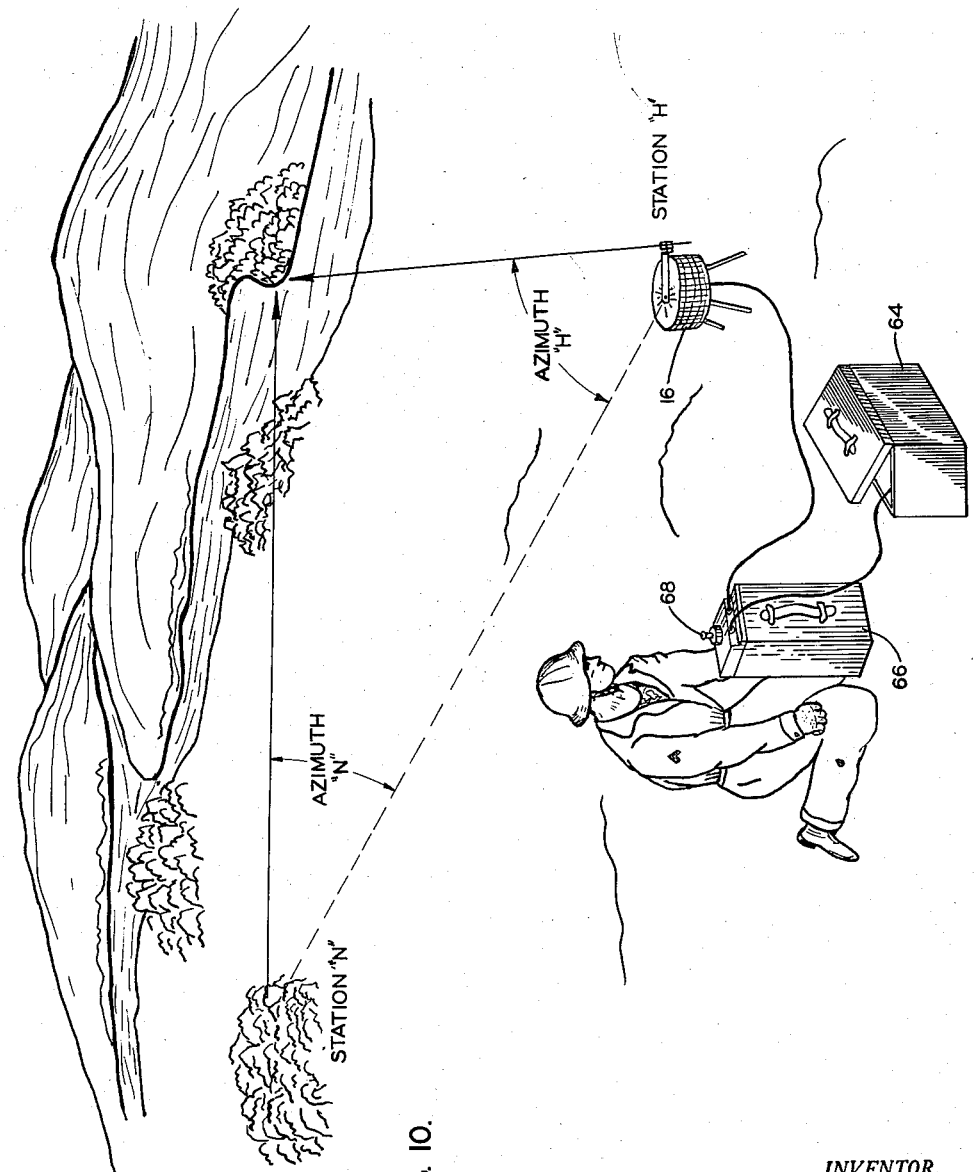
Fig. 10 illustrates a suitable arrangement for utilizing the present invention in locating a sound source by triangulation.

One form of transducer is shown in Fig. 3, shown generally in Fig. 10 at 16, it consists of a microphone assembly 17 which is enclosed within a housing comprised of the upper and lower disks, 18 and 19, and the windscreen 20 which is formed from a covering 21 of cloth or other pervious material supported on a framework of, for example, wire screening 22. The transducer is provided with tripod legs 23, which may be foldable for convenience in transportation. Magnetic compass 24, circular bubble level 25, and viewing sight 26 may be added to assist in the positioning of the microphones in such a manner that readings of the CRT indications will be in an established coordinate system. In the present embodiment sight 26 is rotatable in a plane parallel to the microphone axes, its position being indicated on a circular scale 27 so calibrated that when the scale reading is the same as the reading on the CRT indicator the viewing sight is aimed at the source of sound. Connector 28 is wired to the microphones and mates with a suitable microphone cable.

The microphone assembly 17 may be of various forms some of which are shown in Figs. 4, 5, 6 and 7. Other suitable forms will suggest themselves to persons skilled in the art.

Figure 4:
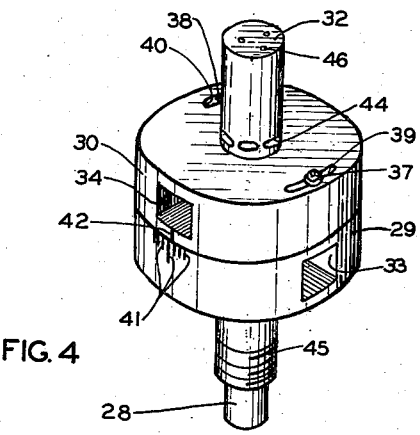
Figs. 4, 5, 6 and 7 illustrate suitable microphone assemblies which may be used in the present invention.
Figure 5:
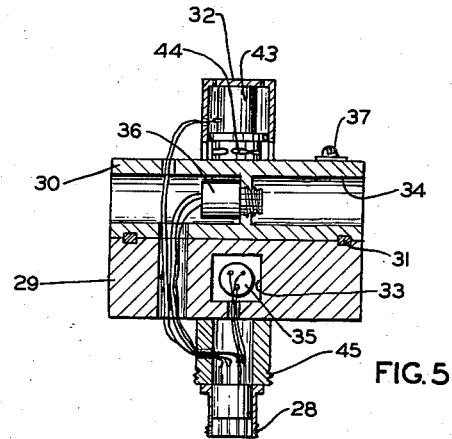

Figs. 4 and 5 illustrate one form of microphone assembly. In this assembly the casings for microphones X and Y are two flat cylinders 29 and 30 rotatable about their common cylindrical axis by means of centering ring 31 which seats in suitable circular grooves. The cylinders are transversed by the diametral ducts 33 and 34 in which are inserted the hot wire grid elements 35 and 36. These units are linear active transducers sensitive to the flow of air across the grids and are described in Review of Scientific Instruments, vol. 9 (Feb. 1938), pages 55 to 57, and in Patent No. 2,255,771 issued to Marcel J. E. Golay.

The two cylinders can be locked together with the desired angle between the ducts (the angle desired between microphone axes) by means of the assembly screws, 37 and 38, and the arced slots, 39 and 40, the angle being indicated by means of scale 41 and index 42. Microphone 43 shown as Z in Fig. 1 may be situated above the directional microphones, held in place in the extension 32, access for sound being provided by means of the openings 44. All electrical connections are brought to connector 28 which is fastened to the lower disk 29. Screw thread 45, and tapped holes 46 are provided to fasten the microphone assembly to the lower and upper disks respectively of the transducer housing.

Figure 6:
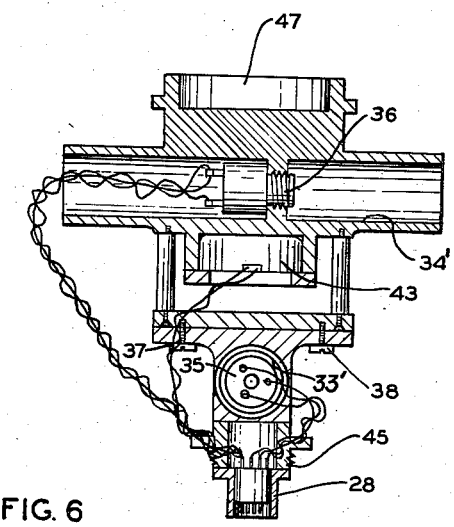

Another form of the microphone assembly is shown in Fig. 6. In this form, the linear hot wire elements 35 and 36 are placed in diametral ducts 33' and 34' of circular cross section which function in the same manner as ducts 33 and 34, respectively, of Fig. 4. Microphone Z, shown at 43, is fastened by suitable clamps and is secured between the two directional microphones. The recess 47 may be used for mounting a compass and level, etc., since this recess is readily accessible when the microphone assembly is mounted in a suitable housing. The housing is designed so that the entire microphone assembly is rotatable about its vertical axis with respect to the housing so that the microphone can be oriented as desired without moving the housing.

Figure 7:
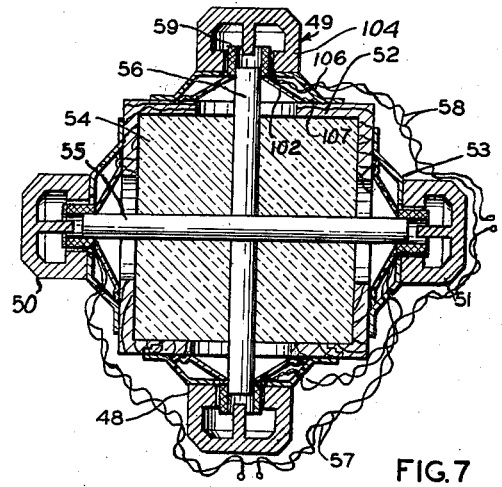

Still another form of microphone assembly is illustrated in Fig. 7. In this embodiment small matched moving coil loudspeakers 48, 49, 50 and 51 are placed over holes 53 in four sides of a cubical box 52 and the coils 59 of opposite pairs are connected in series through conductors 57 and 58 in such phase that a current thru the two coils causes both coils to move in the same direction. Each pair of loudspeakers is then capable of acting as a directional microphone as required for use in the transducer of this invention. The construction of this type of loudspeaker is well known, and since speakers 48–51 are identical, the structure of only speaker 49 will be described. As illustrated, speaker 49 consists of a paper cone 102, the apex of which is fastened to moving coil 59 located in the magnetic field provided by permanent magnet 104. The base of cone 102 is supported on box 52 and is provided with a conventional flexible mounting 107 which is attached to the base of support frame 106. As shown, magnet 104 is conventionally supported in position by the upper portion of frame 106. By this arrangement, the coil and cone assembly is free to move as a unit. The box may be filled or lined with sound absorbing material 54 is desired. Light paper tubes 55, 56 may be used to provide mechanical coupling between the pairs of cones, but such couplings are not essential. To enable one tube to pass above the other, the loudspeakers are displaced slightly from the centers of the cube faces. A fifth loudspeaker (not shown) may be mounted over a hole on a fifth side of the cube to serve as microphone Z of Fig. 1.

Other modifications of the microphone may employ ribbon type directional microphones. The construction of this type of microphone is well known.

In one form of this invention the deflection amplifiers 1 and 2 are as shown in Fig. 8 both amplifiers being identical in construction. In this particular amplifier, the electrical signal from a directional microphone is fed to input transformer 60 and is amplified in cascaded stages J and K. A portion of the output of stage K is fed back thru filter section C to the first stage J to introduce a band pass characteristic and improve the stability of amplification. The filters for both deflection amplifiers are carefully matched, as a result of which both amplifiers are very nearly identical with respect to frequency and phase shift characteristics. The output circuit of stage K includes attenuating potentiometer for adjusting the amplitude level of the input signal coupled to grid 63 of tube 64. Grid 63, cathode 65 and plate 66 of tube 64 designate the elements of an amplifier, while grid 67, cathode 68 and plate 69 designate the elements of a phase inverter. The output from plate 66 is coupled to grid 67 of the phase inverter through capacitor 70. Thus the output signals of plates 66 and 69 are 180° out of phase. In order to equalize the amplification of both halves of tube 64, voltage dividing resistors 71 and 72 are connected in series with plate 66, and coupling capacitor 70 is connected at the junction of these two resistors. The outputs from plates 66 and 69 are respectively coupled to grids 73 and 74 of push-pull amplifier stage M. The output of stage M is coupled to one pair of deflection plates of the cathode ray tube to produce, when combined with the circuit of Fig. 2, a radial trace on the screen thereof. The attenuators for both deflection amplifiers are carefully matched and are mounted, together with the sense amplifier attenuator, on a common shaft to introduce the same attenuation into all three channels, enabling the equipment to accommodate signals varying over a wide range of intensities. The attenuators for both deflection amplifiers are carefully matched and are mounted, together with the sense amplifier attenuator, on a common shaft to introduce the same attenuation into all three channels, enabling the equipment to accommodate signals varying over a wide range of intensities.

It will be understood that the provision of separate amplifiers and attenuators for the three microphone channels is not essential for the successful reduction to practice of this invention, since there are numerous methods known for the simultaneous and equal amplification of a plurality of signals in a single amplifier (e.g. carrier systems, switching systems) and such methods may be used to replace all or parts of the three existing channels.

Figure 9:
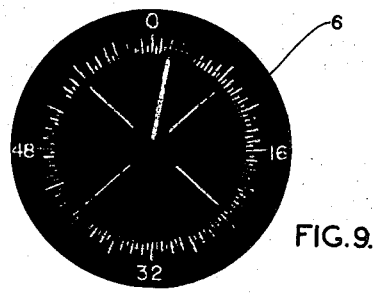
Fig. 9 shows the general appearance of the flourescent screen as seen by the observer.

The characteristics of this type of sound direction finder are such that when a transient sound travels over a plurality of paths so as to be prolonged in duration when heard by the transducer, but without enough difference in the path lengths to present distinct echoes, and when, moreover, the different projections of the paths in the azimuthal plane lie in different directions so that there is some uncertainty as to the sound direction, such uncertainty will usually be indicated by the display of an open figure instead of a straight line on the cathode ray tube. Fig. 9 shows the general appearance of the fluorescent screen, trace and scale as seen by the observer. It will be evident that this direction finder is equally suitable for continuous or repetitive sounds as for varying or transient sounds.

With two or more sets of this apparatus positioned at geographically separated points whose coordinates are known, the location of a sound source is made by triangulation after each station has determined the direction of sound arrival as in Fig. 10. Here a station "H" is provided with a transducer 16, a power pack 64 and a direction finder unit 66 which includes X, Y and Z amplifiers and a cathode ray tube observable through eyepiece 68. A station "N" located a convenient distance away is provided with a similar set. The location of the sound source is readily determined after azimuths "N" and "H" are observed.

I claim:

1. In a sound direction finder a pair of directional microphones arranged at right angles to each other, amplifying means connected to each microphone, a cathode-ray tube receiving the output of the amplifying means and arranged for deflecting the cathode-ray trace as a function of the angle between the wave front generated by a sound source to be located and the microphones, a nondirectional microphone, amplifying means for said nondirectional microphone, and a suppression grid in the cathode-ray tube energized by the output of the last named amplifying means for suppressing a portion of the trace.

2. A source of sound direction finder comprising a microphone array including a pair of microphones having precise cosine directional characteristics arranged with their axes intersecting at an approximate right angle, a pair of amplifiers respectively coupled to a corresponding microphone, a cathode-ray tube having means for generating a cathode ray beam, vertical and horizontal deflection plates for deflecting said beam and an intensity grid for blocking and unblocking said beam, the outputs of said amplifiers being connected to said deflection plates for controlling the deflection of said beam as a function of the angle between said source of sound and said array, a nondirectional microphone located adjacent said directional microphones, and an amplifier coupled to said nondirectional microphone, said amplifier having an output circuit connected to the intensity grid of said cathode ray tube for blocking and unblocking said beam, the output of said amplifier being co-phased with the outputs impressed on said deflection plates whereby said beam is unblocked only when said plates can deflect said beam in the true direction of said source.

3. In a source of sound direction-finder, a pair of directional microphones positioned at right angles to each other, amplifying means connected to each microphone, a cathode-ray tube having a screen, means for generating a cathode-ray beam, first and second sets of orthoganally related electrostatic deflecting plates and an intensity grid, connections between the respective amplifying means and said first and second set of deflecting plates for producing two reversible electrostatic fields capable of deflecting said beam both in the true direction corresponding to the location of said source with respect to said finder and in a direction 180° out of phase with said true direction, a nondirectional microphone, an amplifying means connected to said nondirectional microphone and having its output co-phased with said fields, and means for applying said output to the intensity grid of said cathode-ray tube for blocking said cathode-ray beam at the instant of the reversal of said electrostatic fields, whereby the line image produced on said screen by said beam indicates only the true direction of said source with respect to said finder.

4. Apparatus for discriminating between ballistic wave and muzzle blast sound waves and for determining the direction of propagation of said muzzle blast sound waves comprising two microphones, each of said microphones responsive to said sound waves for generating indicating voltages, a third microphone, having different characteristics than said two microphones, responsive to said sound waves for generating control voltages, indicating means, means for supplying said indicating voltages to said indicating means, control means coupled to said indicating means, and means for supplying said control voltages to said control means so that when said control voltages are generated in response to said muzzle blasts, said indicating means will be responsive to said indicating voltages.

5. Apparatus as defined in claim 4, wherein said indicating means includes a cathode ray tube.

6. Apparatus for discriminating between ballistic wave and muzzle blast sound waves comprising a plurality of microphones responding to said ballistic waves and said muzzle blasts with first and second signals respectively, having first and second wave forms respectively, normally inoperative indicating means, means for supplying a portion of said first and second signals to said indicating means and means responsive to said signals having said second waveform for rendering operative said indicating means.

7. In an apparatus for indicating the arrival direction of sound waves of predetermined frequencies, in combination, a plurality of microphones, a cathode ray indicator tube coupled to said microphones to indicate the arrival direction of sound waves at said microphones and having a beam-intensity control electrode, and circuit means coupled between said microphones and said control electrode for supplying a beam intensifying voltage to said control electrode in response to the arrival of waves of said predetermined frequencies at said microphones and for supplying a beam-inhibiting voltage to said control electrode in response to the arrival of waves of other than said predetermined frequencies at said microphones.

8. Apparatus as defined in claim 6, wherein said indicating means includes a cathode ray tube.

References Cited in the file of this patent

UNITED STATES PATENTS

| | | |
|---|---|---|
| 2,173,219 | Anderson | Sept. 19, 1939 |
| 2,304,965 | Sproule | Dec. 15, 1942 |
| 2,349,370 | Orner | May 23, 1944 |
| 2,350,080 | Sproule | May 30, 1944 |
| 2,368,953 | Walsh | Feb. 6, 1945 |
| 2,397,746 | Lewis | Apr. 2, 1946 |
| 2,403,974 | Goodale | July 16, 1946 |
| 2,406,014 | Harry | Aug. 20, 1946 |
| 2,411,071 | Wade | Nov. 12, 1946 |
| 2,422,446 | Stuart | June 17, 1947 |
| 2,434,644 | Fairweather | Jan. 20, 1948 |